United States Patent
Usui et al.

(10) Patent No.: US 11,474,074 B2
(45) Date of Patent: Oct. 18, 2022

(54) DETECTION APPARATUS, CONVERGENCE MEMBER, AND NOISE CANCELLATION SYSTEM

(71) Applicant: KABUSHIKI KAISHA TOSHIBA, Tokyo (JP)

(72) Inventors: Takashi Usui, Saitama Saitama (JP); Hiroshi Ohno, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 227 days.

(21) Appl. No.: 17/006,937

(22) Filed: Aug. 31, 2020

(65) Prior Publication Data
US 2021/0231616 A1 Jul. 29, 2021

(30) Foreign Application Priority Data
Jan. 27, 2020 (JP) .............................. JP2020-011101

(51) Int. Cl.
*G01N 29/04* (2006.01)
*G10K 11/172* (2006.01)
*G10K 11/162* (2006.01)

(52) U.S. Cl.
CPC ......... *G01N 29/043* (2013.01); *G10K 11/162* (2013.01); *G10K 11/172* (2013.01); *G01N 2291/044* (2013.01)

(58) Field of Classification Search
CPC ........... G01N 29/043; G01N 2291/044; G01N 2291/0232; G01N 2291/0234; G01N 2291/0289; G01N 29/14; G01N 29/2468; G01N 29/041; G10K 11/162
See application file for complete search history.

(56) References Cited

U.S. PATENT DOCUMENTS

| | | | | | |
|---|---|---|---|---|---|
| 4,481,821 A | * | 11/1984 | Chamuel | ............ | G01N 29/2412 73/644 |
| 5,714,687 A | * | 2/1998 | Dunegan | .................. | G01H 1/00 73/652 |
| 8,280,709 B2 | * | 10/2012 | Koutsabeloulis | ....... | E21B 43/00 703/10 |
| 8,919,202 B2 | * | 12/2014 | Keely | .................. | F04D 29/542 73/649 |

(Continued)

FOREIGN PATENT DOCUMENTS

JP 2019-518191 A 6/2019

OTHER PUBLICATIONS

Gaucher, "Piezoelectric micro-electro-mechanical systems for acoustic applications," Piezoelectric Materials in Devices (2002), 26 pages.

(Continued)

*Primary Examiner* — Francis C Gray
(74) *Attorney, Agent, or Firm* — Finnegan, Henderson, Farabow, Garrett & Dunner L.L.P.

(57) ABSTRACT

A detection apparatus according to an embodiment includes a convergence member and a sensor. The convergence member comes into contact with a test object and has an elastic-modulus distribution in which an elastic modulus decreases as a distance from a center of the convergence member increases. The sensor is placed in an area including the center of the convergence member. The sensor detects, through the convergence member, an elastic wave generated from the test object.

9 Claims, 15 Drawing Sheets

(56) References Cited

U.S. PATENT DOCUMENTS

| | | | |
|---|---|---|---|
| 2007/0095138 A1* | 5/2007 | El-Bakry | G01H 1/00 |
| | | | 73/583 |
| 2009/0070048 A1* | 3/2009 | Stothers | G01N 29/14 |
| | | | 73/587 |
| 2012/0174672 A1* | 7/2012 | Tsuruno | B25J 13/083 |
| | | | 73/627 |
| 2017/0261226 A1 | 9/2017 | Mathur | |
| 2019/0257793 A1* | 8/2019 | Yazzie | G01N 29/4445 |
| 2020/0209195 A1* | 7/2020 | Kitazawa | G01N 29/07 |

OTHER PUBLICATIONS

Nishikawa et al., "Effects of Porosity and Pore Morphology on Mechanical Properties of Porous Alumina," J. Soc. Mat. Sci., Japan (Jun. 2001), pp. 625-629.

* cited by examiner

| MATERIAL | ULTRASONIC PROPAGATION VELOCITY v [m/s] |
|---|---|
| IRON | 5950 |
| FIRST CONCRETE | 4570 |
| SECOND CONCRETE | 3660 |

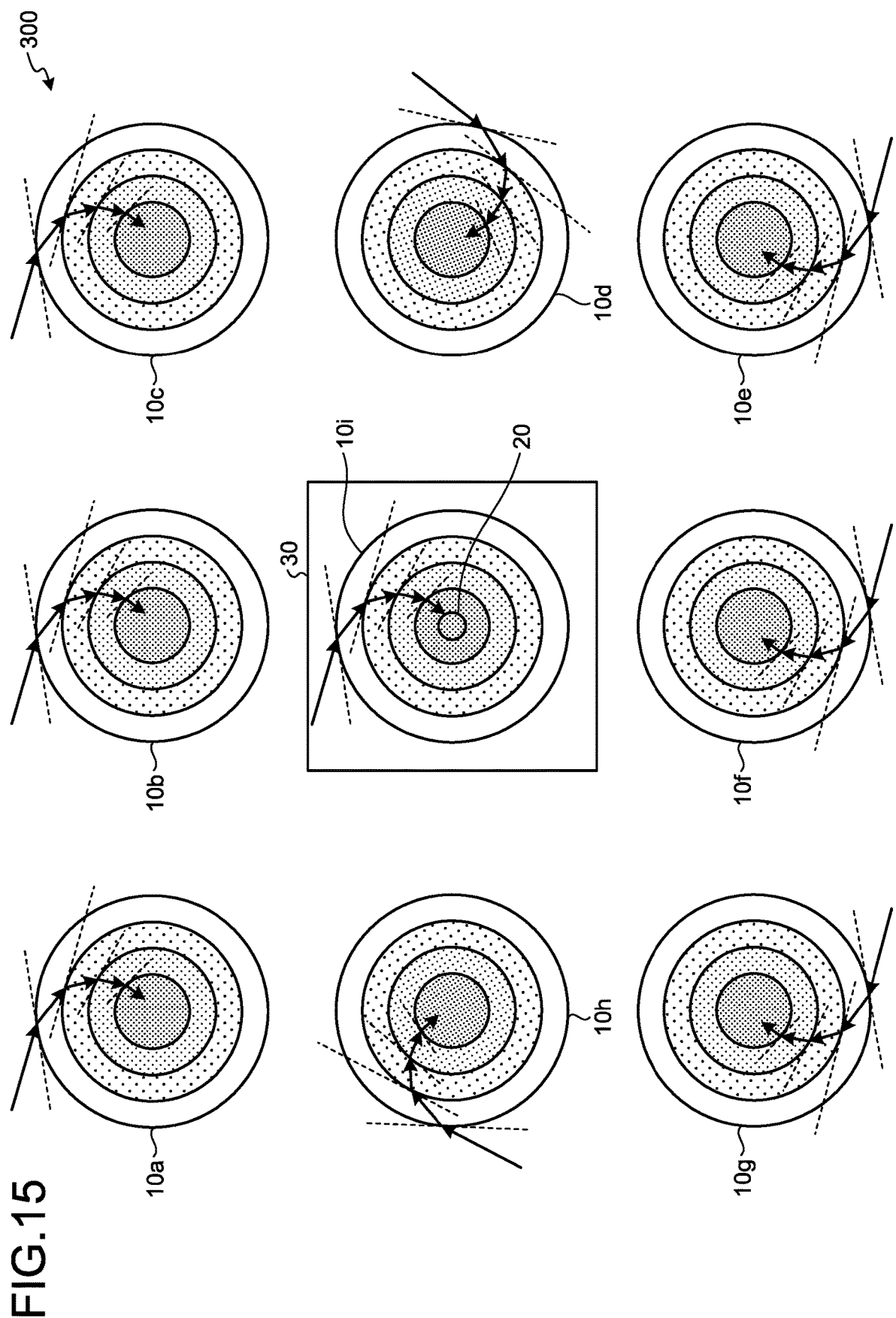

DETECTION APPARATUS, CONVERGENCE MEMBER, AND NOISE CANCELLATION SYSTEM

CROSS-REFERENCE TO RELATED APPLICATIONS

This application is based upon and claims the benefit of priority from Japanese Patent Application No. 2020-011101, filed on Jan. 27, 2020; the entire contents of which are incorporated herein by reference.

FIELD

Embodiments described herein relate generally to a detection apparatus, a convergence member, and a noise cancellation system.

BACKGROUND

In recent years, problems caused by age deterioration of structures, such as bridges constructed in the high economic growth period, have come to the surface. As loss incurred in the event of an accident occurring in such structures is immeasurable, techniques for monitoring a state of a structure are conventionally known. For example, there is known a technique of detecting a damage in a structure by an acoustic emission (AE) process in which an elastic wave generated due to occurrence of an internal crack or development of an internal crack is detected using a highly-sensitive sensor.

However, in the conventional art, it is difficult to detect a weak elastic wave. For example, it is difficult to detect an elastic wave generated due to a crack, abrasion, rubbing, and the like in an early stage.

BRIEF DESCRIPTION OF THE DRAWINGS

FIG. 15 is a diagram illustrating an example of a noise cancellation system in a second embodiment.

DETAILED DESCRIPTION

A detection apparatus according to an embodiment includes a convergence member and a sensor. The convergence member comes into contact with a test object and has an elastic-modulus distribution in which an elastic modulus decreases as a distance from a center of the convergence member increases. The sensor is placed in an area including the center of the convergence member. The sensor detects, through the convergence member, an elastic wave generated from the test object.

Hereinafter, embodiments of a detection apparatus, a convergence member, and a noise cancellation system will be described in detail with reference to accompanying drawings.

First Embodiment

Acoustic emission is generation of an elastic wave due to development of a fatigue crack in a material. In an AE process, such an elastic wave is detected as a voltage signal (AE signal) by an AE sensor using a piezoelectric element. An AE signal is detected as a sign of fracture of a material before the material is broken, and thus a frequency of occurrence and a signal strength of an AE signal are useful as indicators of soundness of the material. For this reason, research on techniques of detecting a premonitory sign of deterioration of a structure by an AE process is being actively carried out. For corrosion diagnosis of an oil tank, a manufacturing process of a mechanical apparatus, and the like in particular, detecting techniques using an AE process are widely used mainly in European and U.S. countries, and further, standardization of detecting techniques using an AE process is in progress.

Meanwhile, an elastic wave generated due to a crack, abrasion, rubbing, and the like inside a material is extremely weak, and thus how to sensitively detect a weak elastic wave is a matter of great significance.

A serious problem to be posed in detecting an elastic wave generated in a material using a sensor placed on the surface of the material is reflection at a boundary between different kinds of materials. It is known that remarkable reflection occurs at an interface where materials differing considerably in acoustic impedance, which is a value characteristic of each material, are in contact with each other, in particular. Supposing that p represents a density of a material and c represents a sonic velocity in the material, acoustic impedance z is expressed by the following Expression (1).

$$z = \rho c \tag{1}$$

Figure 1:
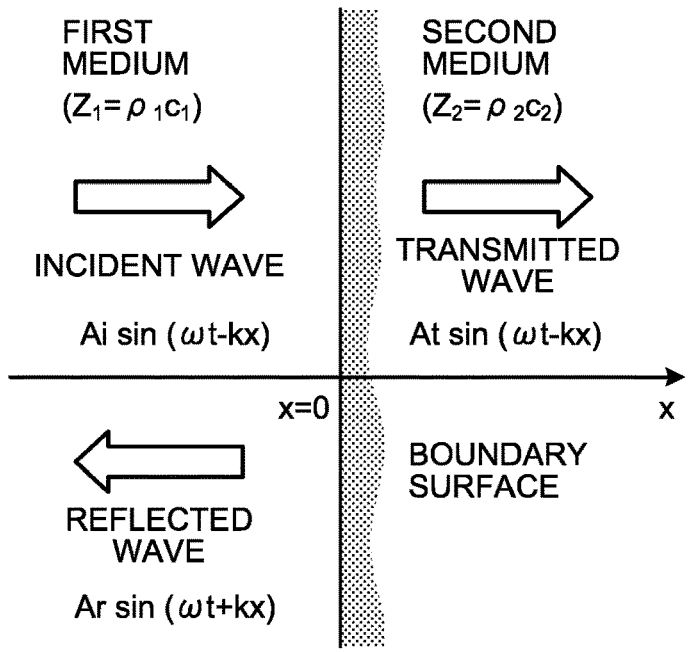
FIG. 1 is a diagram illustrating a relationship between acoustic impedance and reflection.

FIG. 1 is a diagram illustrating a relationship between acoustic impedance and reflection. As illustrated in FIG. 1, an elastic wave is reflected at a boundary between materials with different acoustic impedance (z1, z2) and its reflectivity Rp is expressed by the following Expression (2).

$$R_p = \frac{Z_2 - Z_1}{Z_1 + Z_2} \tag{2}$$

More specifically, reflection is reduced as a difference in acoustic impedance becomes smaller, and reflection is typically enhanced as a difference in acoustic impedance between materials becomes larger. Acoustic impedance varies from material to material. For example, acoustic impedance of iron is 46.4×106 [kg/m2s], and acoustic impedance of water is 1.5×106. In contrast thereto, acoustic impedance of air is approximately 428 [kg/m2s]. Thus, it is understood that because of such a large difference in acoustic impedance between metal and air, existence of a void in a propagation path of an elastic wave propagating through metal enhances reflection at a boundary surface. Then, grease or the like is commonly provided as a couplant in placing a sensor to prevent a void from being formed between the sensor and a target structure.

Further, as an element detecting an elastic wave, a piezoelectric element such as lead zirconate titanate (PZT) is used. In this case, it is known that a matching layer formed of ceramic or the like with acoustic impedance that is intermediate between those of a piezoelectric element and a target object is provided between the piezoelectric element and the target object (refer to N. Setter, Piezoelectric Materials in Devices (Lausanne: EPFL, 2002)).

When PZT is taken as an example, an output voltage Vo thereof is expressed by the following Expression (3) in which g|V·m/N| represents a voltage output count, σ|m| represents surface displacement, and E[N/m2] represents an elastic constant.

$$V_o = g \cdot \sigma \cdot E \tag{3}$$

When assuming that Vn is a noise caused by an element, surface displacement σlim corresponding to a theoretical detection limit is expressed by the following Expression (4).

$$\sigma_{lim} = V_n / (g \cdot E) \tag{4}$$

An elastic wave that brings about surface displacement below the above-described σlim cannot be detected. Thus, a simple improvement of a couplant according to the conventional art ends in a deadlock, and there arises a problem of inclusion of an undetectable elastic wave among elastic waves (AE waves) that are generated by a crack, abrasion, rubbing and the like in an early stage and bring about surface displacement below the above-described σlim.

In the following first embodiment, there will be described about a detection apparatus that includes a convergence member having a predetermined gradient of an elastic modulus (refractive index) between a sensor and a test object to cause an elastic wave to converge only using a mechanical structure, and thus can detect a weak elastic wave that could not be detected according to the conventional art.

Figure 2:
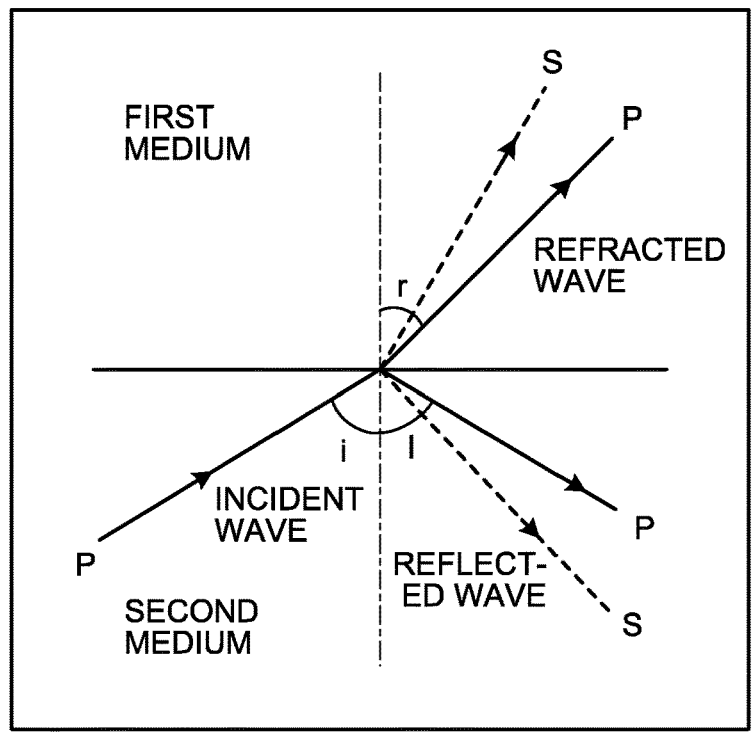
FIG. 2 is a diagram for explaining refraction of an elastic wave.

FIG. 2 is a diagram for explaining refraction of an elastic wave. As illustrated in FIG. 2, an elastic wave is refracted at a boundary between media. In the case of an elastic wave, when a P wave is incident upon a boundary surface, a refracted wave of the P wave and a refracted wave of an S wave (P-to-S converted wave) occur. Further, also when an S wave is incident upon a boundary surface, there occur the same things as those occurring when a P wave is incident upon a boundary surface. An angle of refraction of each wave is determined by a P-wave propagation velocity Vp and an S-wave propagation velocity Vs of each medium. Regarding a refractive index, a refractive index $n_{p12}$ of a P wave and a refractive index $n_{s12}$ of an S wave are respectively expressed by the following expressions (5) and (6) in which Vp1 and Vs1 respectively represent a P-wave velocity and an S-wave velocity of a first medium and Vp2 and Vs2 respectively represent a P-wave velocity and an S-wave velocity of a second medium.

$$n_{p12} = Vp1/Vp2 \tag{5}$$

$$n_{s12} = Vs1/Vs2 \tag{6}$$

A P-wave propagation velocity Vp and an S-wave propagation velocity Vs are expressed by the following Expression (7) and (8) that uses a Young's modulus E and a Poioisson's ratio v that are elastic constants characteristics of a solid material, and a density ρ.

$$V_p = \sqrt{\frac{E(1-v)}{\rho(1+v)(1-2v)}} \tag{7}$$

$$V_s = \sqrt{\frac{E}{2\rho(1+v)}} \tag{8}$$

$$\Gamma = \frac{V_p}{V_s} = \sqrt{\frac{2v-2}{2v-1}} \tag{9}$$

Further, a ratio Γ between a P-wave propagation velocity Vp and an S-wave propagation velocity Vs is expressed by the following Expression (9).

When Poisson's ratios of materials are similar to one another, a P-wave refractive index $n_{p12}$ and an S-wave refractive index $n_{s12}$ between those materials are substantially equal to each other. Thus, by using such materials having similar Poisson's ratios, it is possible to design a gradient of a refractive index (gradient of an elastic modulus gradient) of a later-described convergence member without distinguishing a P-wave and an S-wave.

Alumina is one of materials commonly used as a contact surface of an AE sensor that detects an elastic wave. An elastic constant of a solid material including alumina varies with its porosity. It is experimentally known that the Young's modulus E of porous alumina in particular follows a power rule expressed by the following Expression (10) that uses a bulk Young's modulus $E_0$ and porosity P (refer to J. Soc. Mat. Sci., Japan, Vol. 50, No. 6, pp. 625-629 (2001)).

$$E = E_0(1 - A \cdot P^{2/3}) \tag{10}$$

Further, it is stated that a Poisson's ratio is slightly reduced linearly with increase of porosity P. However, the change is small and a ratio F between a P-wave propagation velocity Vp and an S-wave propagation velocity Vs also does not change greatly. Thus, a refractive index $n_{p12}$ of a P-wave and a refractive index $n_{s12}$ of an S-wave can be treated substantially equally.

Figure 3:
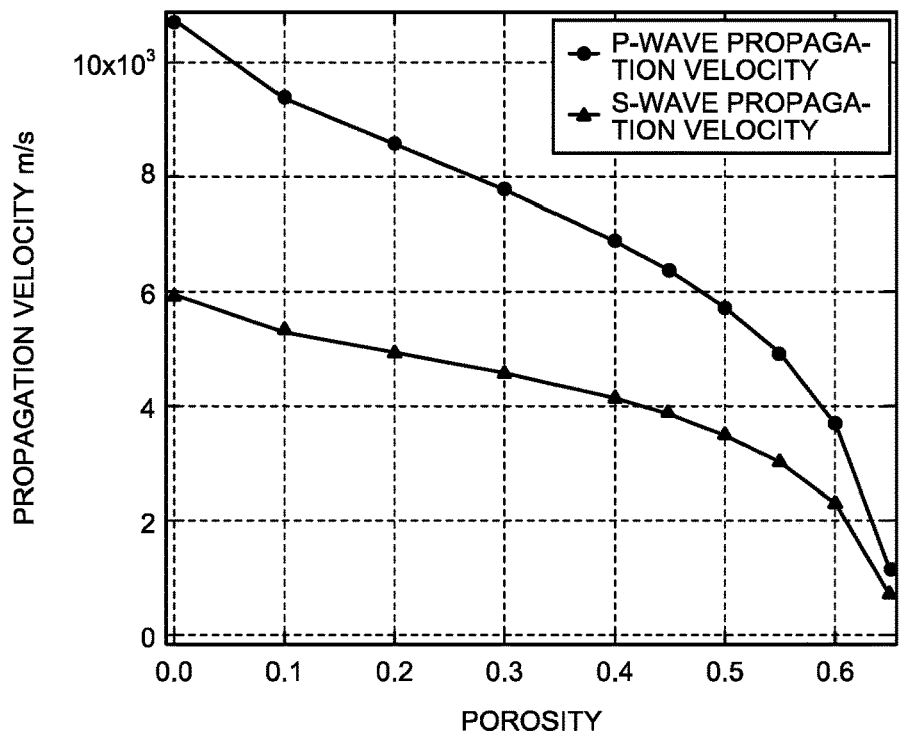
FIG. 3 is a diagram illustrating a relationship between porosity and a propagation velocity.
Figure 4:
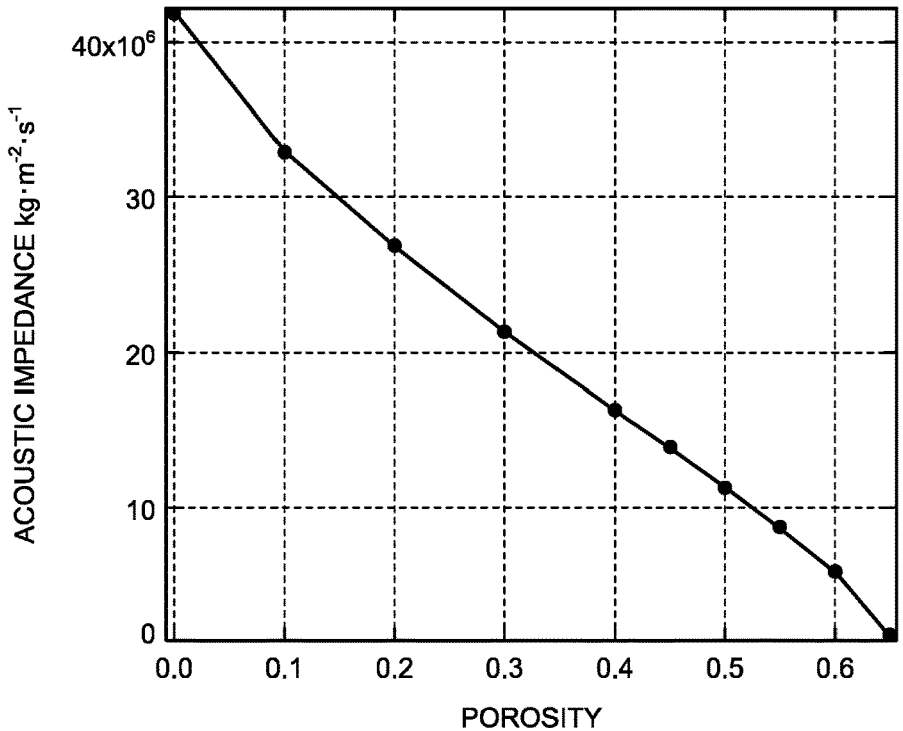
FIG. 4 is a diagram illustrating a relationship between porosity and acoustic impedance.

FIGS. 3 and 4 illustrate results of estimation of an elastic-wave propagation velocity and acoustic impedance from porosity dependencies of a Young's modulus and a Poisson's ratio using porosity of alumina as a parameter.

FIG. 3 is a diagram illustrating a relationship between porosity and a propagation velocity. As illustrated in FIG. 3, a P-wave propagation velocity and an S-wave propagation velocity decrease as porosity increases.

FIG. 4 is a diagram illustrating a relationship between porosity and acoustic impedance. As illustrated in FIG. 4, acoustic impedance decreases as porosity increases.

As shown in FIGS. 3 and 4, a propagation velocity and acoustic impedance can be controlled by porosity, and thus any desired distribution of elastic-wave velocity can be created by control of porosity. Control of porosity can be achieved by formation of ceramic having a pore much smaller than the wavelength of an elastic wave using a 3D printer, a laser, and the like, for example.

A principal material of the convergence member in the first embodiment is formed of alumina (ceramic), for example. The convergence member in the first embodiment is a disk-shaped plate having an elastic-modulus (refractive-index) gradient that is controlled by porosity representing a proportion of a pore to the convergence member and extends along a radius of the pore.

Figure 5:
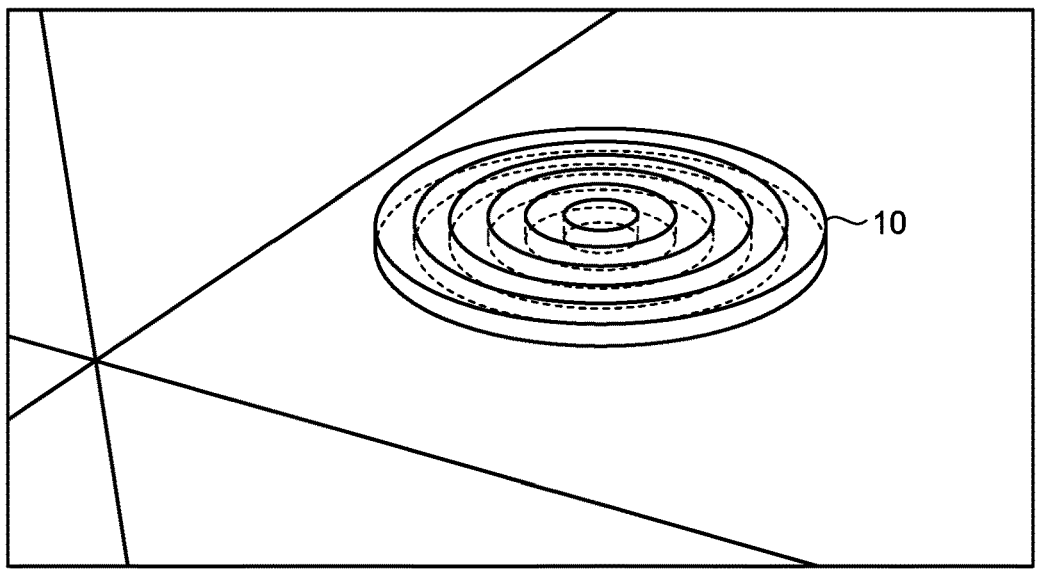
FIG. 5 is a diagram illustrating an example of a convergence member in a first embodiment.

FIG. 5 is a diagram illustrating an example of a convergence member 10 in the first embodiment. In the example in FIG. 5, the convergence member 10 of the first embodiment is an alumina medium with ϕ 96 (a diameter of 96 millimeters) and a thickness of five millimeters. In the example in FIG. 5, the convergence member 10 has a shape of a circle. The convergence member 10 has an elastic-modulus distribution in which an elastic modulus is inversely proportional to a radius in a radial direction from a center of the convergence member 10.

Figure 6:
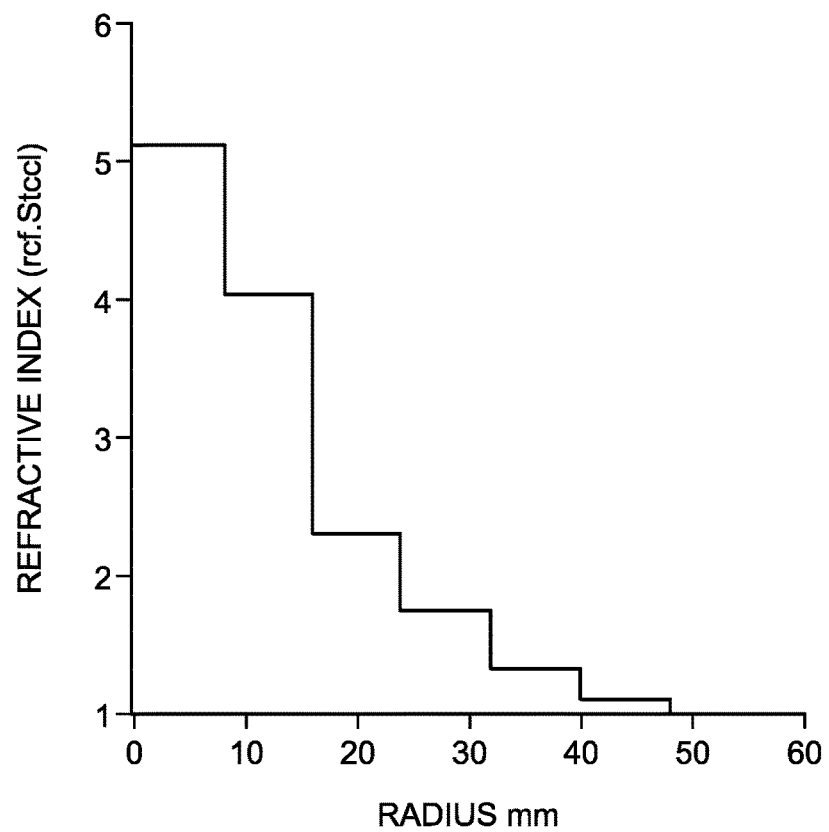
FIG. 6 is a diagram illustrating an example of a refractive-index gradient in the convergence member in the first embodiment.

FIG. 6 is a diagram illustrating an example of a refractive-index gradient in the convergence member 10 of the first embodiment. As illustrated in FIG. 6, the convergence member 10 in FIG. 5 has a refractive-index gradient with six steps formed at four-millimeter intervals in the radial direction. Note that the refractive-index gradient with six steps is a mere example and a refractive-index gradient with N steps (N is an integer equal to or larger than two) may be freely formed in accordance with an environment of placement.

Figure 7:
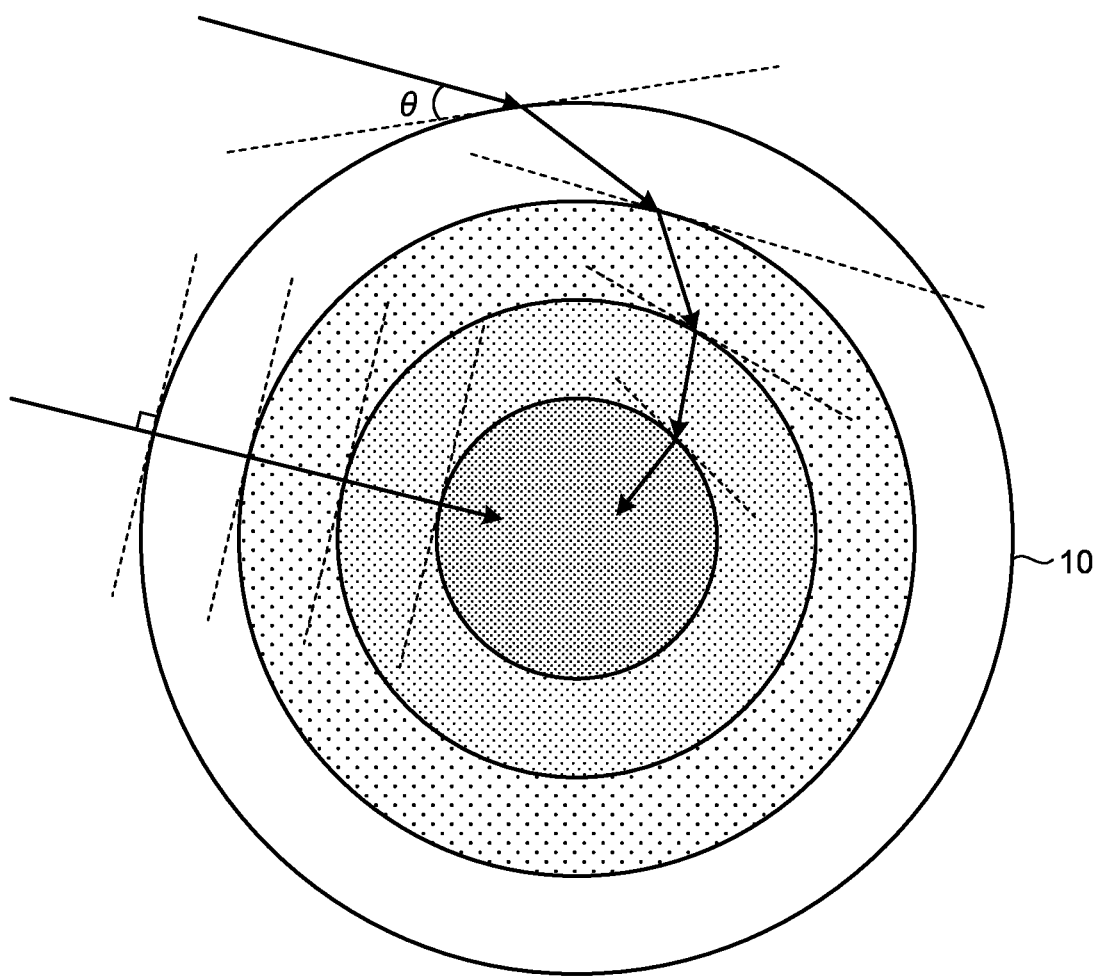
FIG. 7 is a diagram for explaining the manner in which an elastic wave converges on a center of the convergence member in the first embodiment.
Figure 8A:
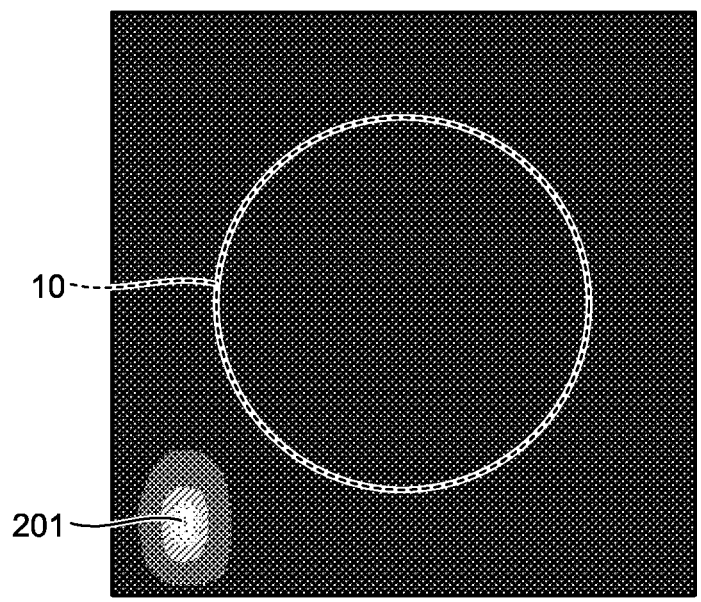
FIG. 8A is a diagram illustrating a simulation result of an elastic wave in the first embodiment.
Figure 8B:
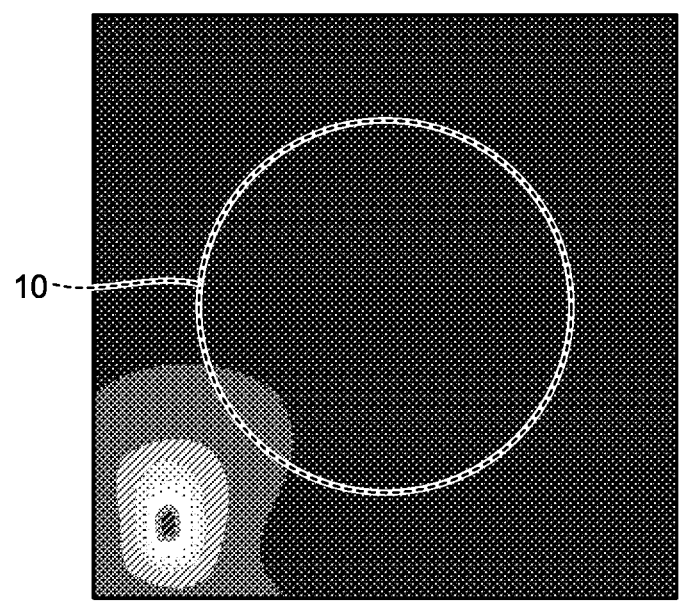
FIG. 8B is a diagram illustrating a simulation result of the elastic wave in the first embodiment.
Figure 8C:
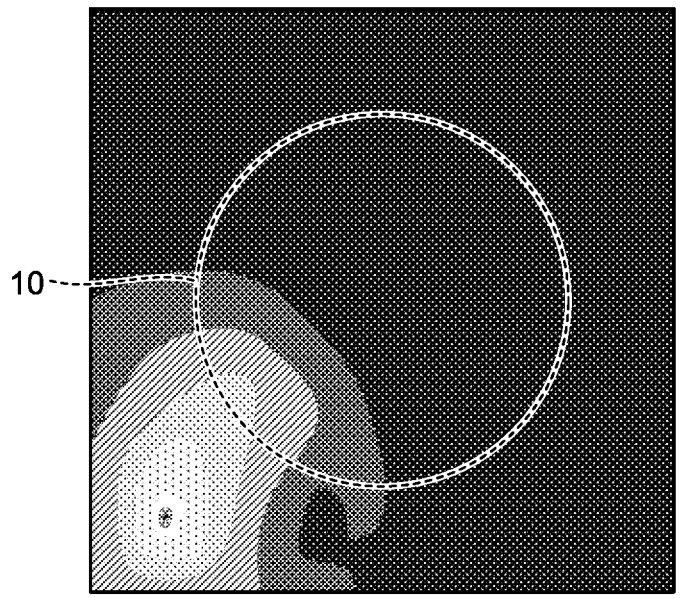
FIG. 8C is a diagram illustrating a simulation result of the elastic wave in the first embodiment.
Figure 8D:
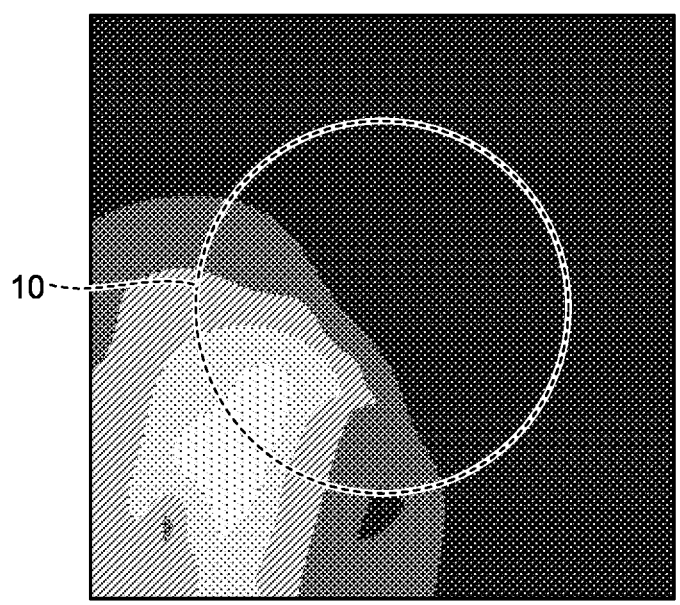
FIG. 8D is a diagram illustrating a simulation result of the elastic wave in the first embodiment.
Figure 8E:
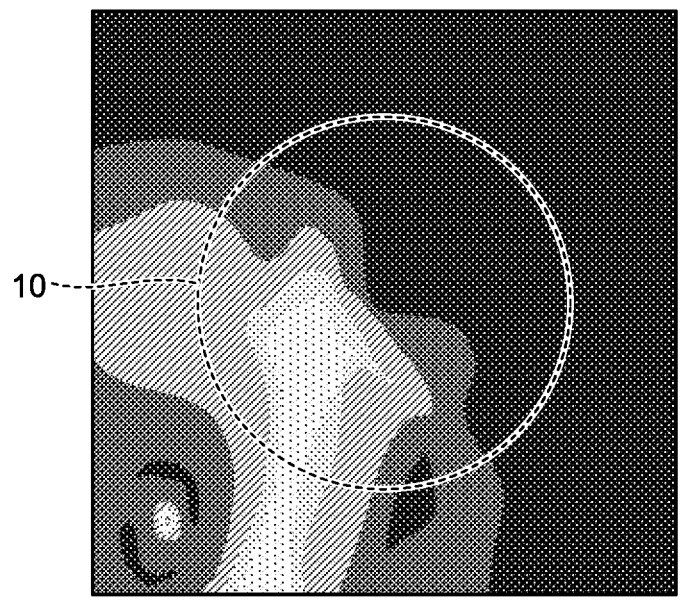
FIG. 8E is a diagram illustrating a simulation result of the elastic wave in the first embodiment.
Figure 8F:
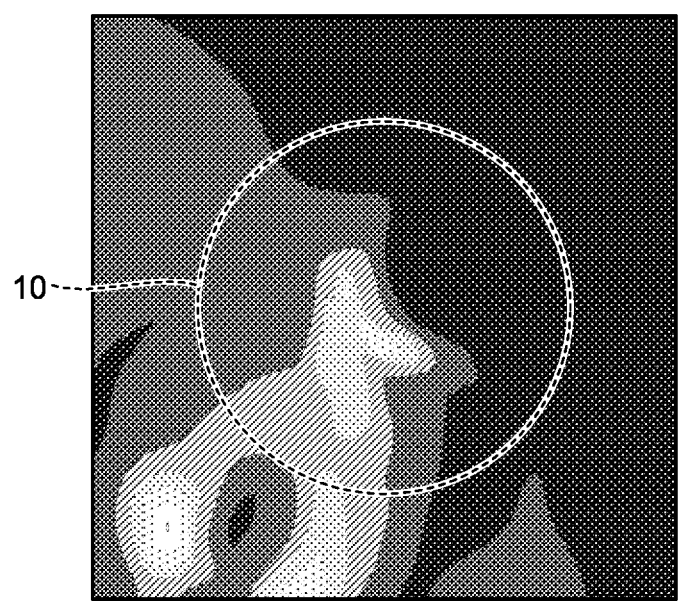
FIG. 8F is a diagram illustrating a simulation result of the elastic wave in the first embodiment.
Figure 8G:
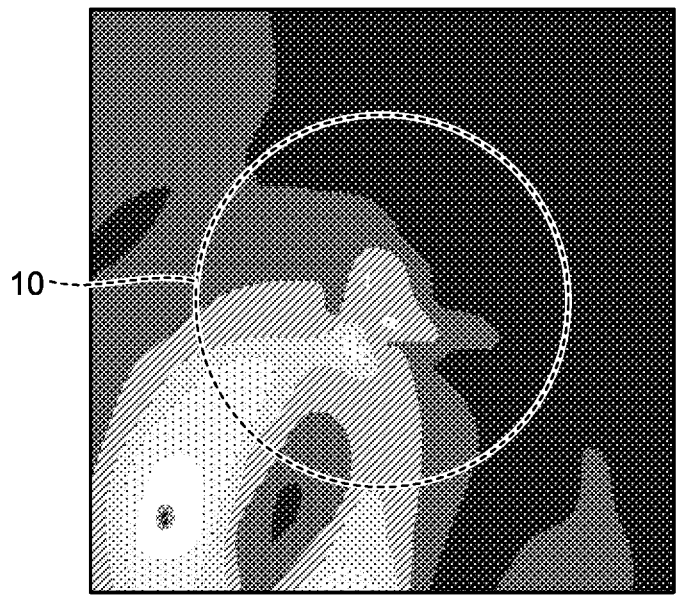
FIG. 8G is a diagram illustrating a simulation result of the elastic wave in the first embodiment.
Figure 8H:
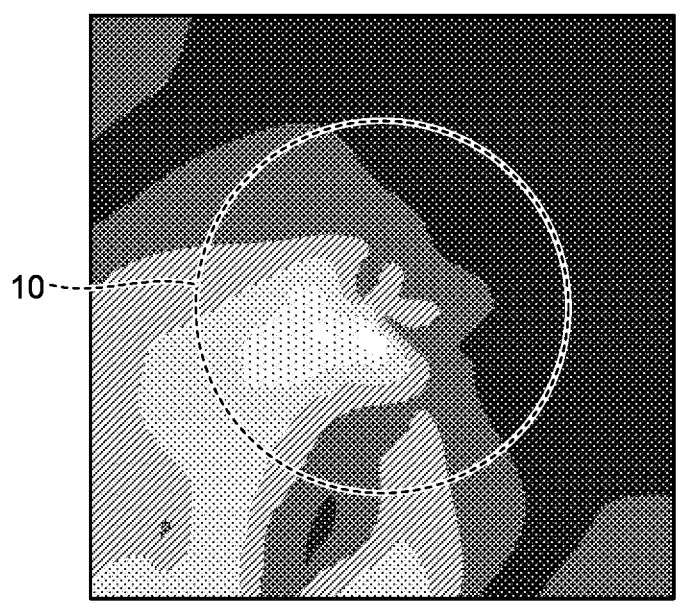
FIG. 8H is a diagram illustrating a simulation result of the elastic wave in the first embodiment.
Figure 8I:
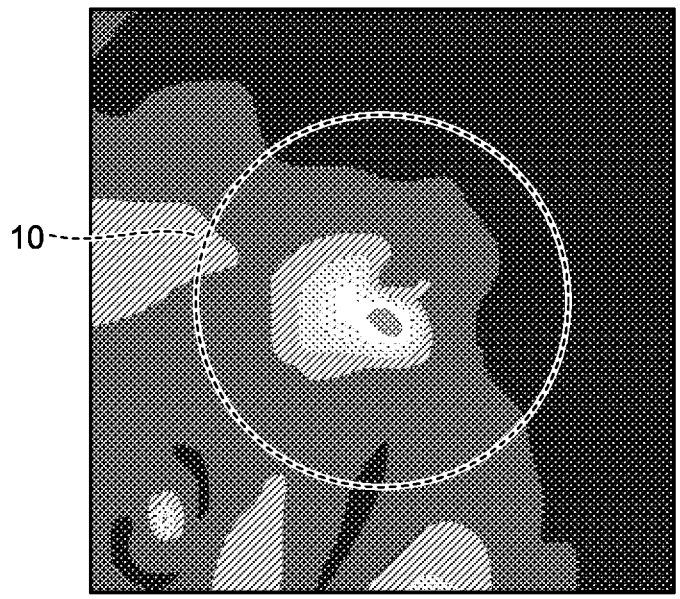
FIG. 8I is a diagram illustrating a simulation result of the elastic wave in the first embodiment.
Figure 8J:
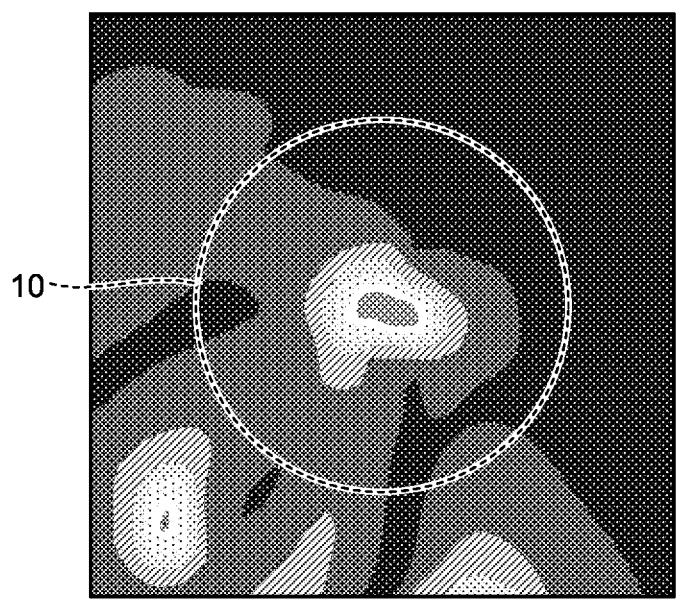
FIG. 8J is a diagram illustrating a simulation result of the elastic wave in the first embodiment.
Figure 8K:
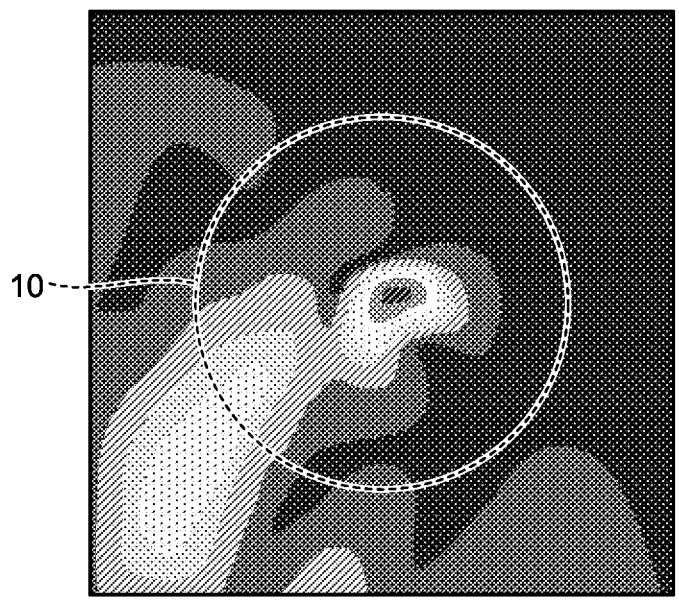
FIG. 8K is a diagram illustrating a simulation result of the elastic wave in the first embodiment.
Figure 8L:
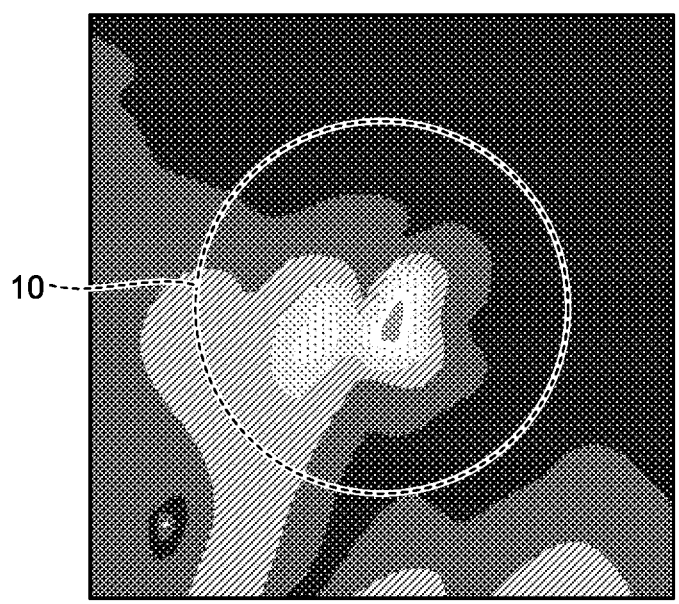
FIG. 8L is a diagram illustrating a simulation result of the elastic wave in the first embodiment.

FIG. 7 is a diagram for explaining the manner in which an elastic wave converges on the center of the convergence member 10 in the first embodiment. As shown in FIG. 7, an elastic wave that enters into the convergence member 10 at an angle θ(≠90°) is refracted at a boundary where porosity changes, so that the elastic wave converges on the center of the convergence member 10. On the other hand, as shown in FIG. 7, an elastic wave that enters into the convergence member 10 at an angle of 90° travels straight toward the center of the convergence member 10, so that the elastic wave converges on the center of the convergence member 10.

FIGS. 8A to 8L are views illustrating simulation results of an elastic wave in the first embodiment Examples in FIGS. 8A to 8L illustrate simulation results of elastic-wave FDTD in a case where an elastic wave is generated from a generation source 201 external to the convergence member 10. Each contour depicted in FIGS. 8A to 8L represents the magnitude of particle velocity vector. In FIGS. 8A to 8L, changes of state in time sequence of 0.01 ms to 0.06 ms later from generation of an elastic wave are illustrated. As understood from FIGS. 8A to 8L, an elastic wave converges on the central area of the convergence member 10 and a portion with a high particle velocity concentrates on the central area.

Example of Detection Apparatus

Figure 9:
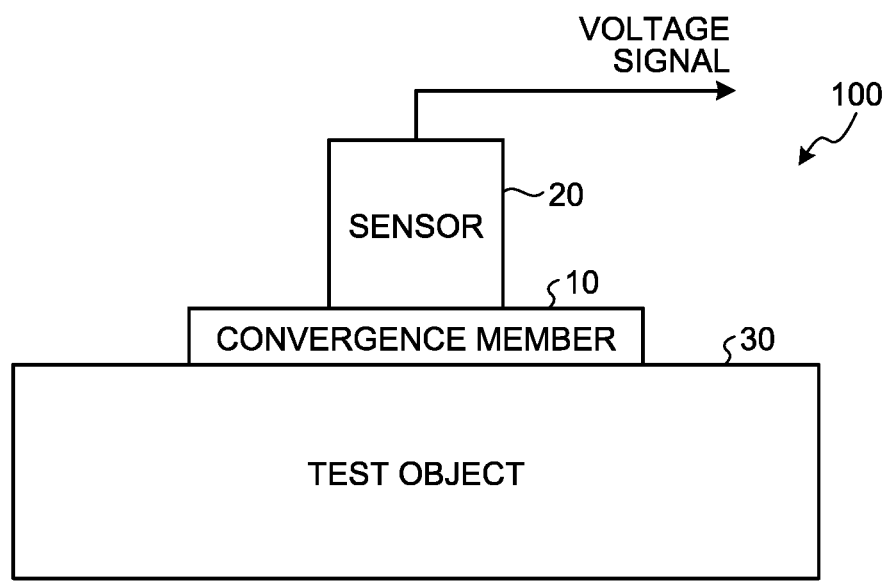
FIG. 9 is a schematic view illustrating an example of a detection apparatus in the first embodiment.

FIG. 9 is a schematic view illustrating an example of a detection apparatus 100 in the first embodiment. The detection apparatus 100 in the first embodiment includes the convergence member 10 and a sensor 20.

The convergence member 10 is placed between the sensor 20 and a test object 30. The description of the convergence member 10, which is the same as that given with reference to FIGS. 5 and 6, is omitted here.

The sensor 20 is an AE sensor including a piezoelectric element or the like that is sensitive to a frequency range of 10 kHz to 1 MHz, for example. The sensor 20 is of a resonance type that has a resonance peak within a frequency range of 10 kHz to 1 MHz, for example, of a wideband type in which resonance is reduced, or of the like type. Further, the sensor 20 may include a preamplifier. The sensor 20 in itself may be of any type such as a voltage-output type, a resistance-change type, or a capacitance type. The sensor 20 detects an AE wave, converts the AE wave into a voltage signal, and outputs the voltage signal.

Example of Nondestructive Testing System

Figure 10:
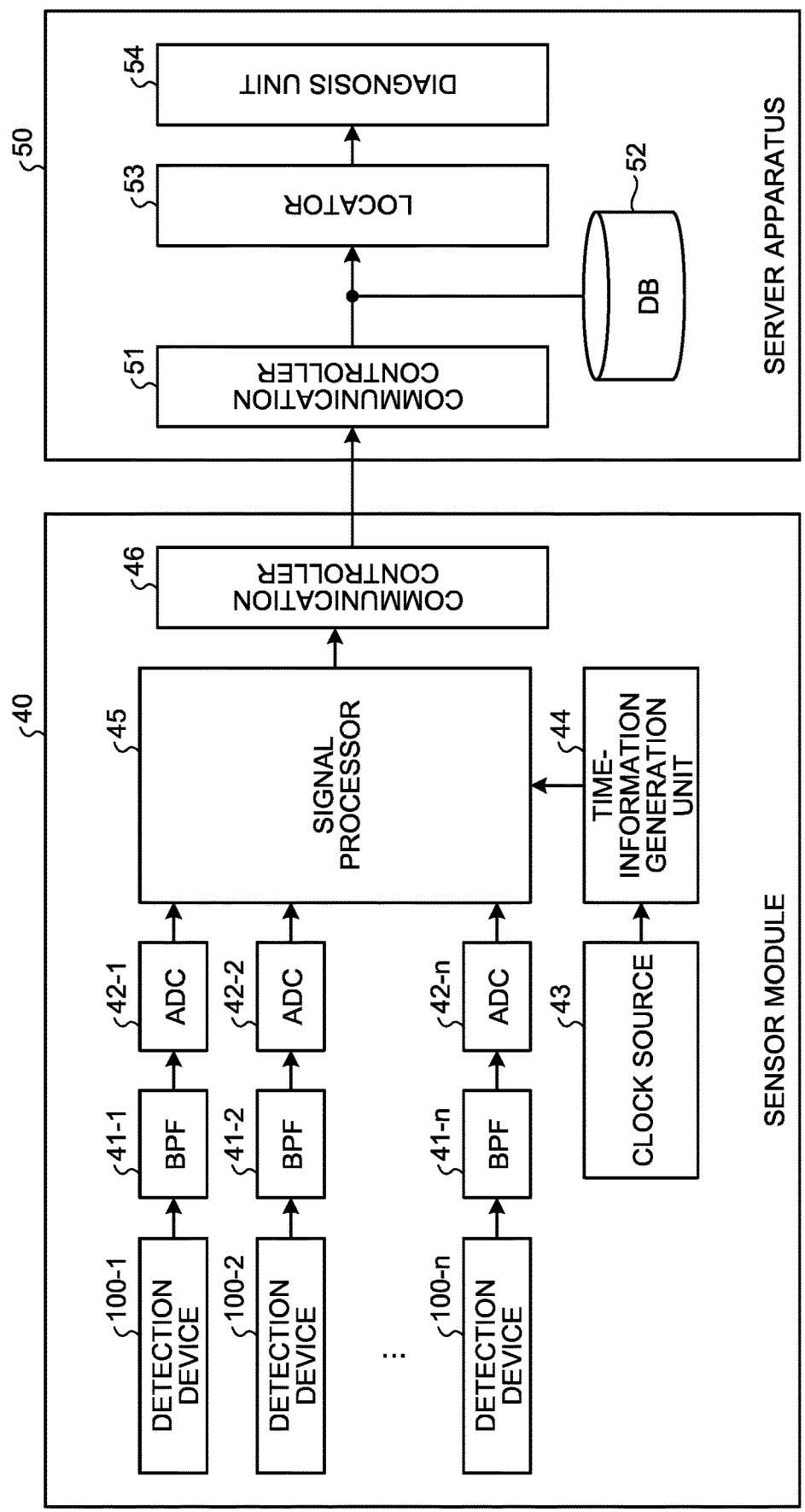
FIG. 10 is a diagram illustrating an example of a nondestructive testing system in the first embodiment.

FIG. 10 is a diagram illustrating an example of a configuration of a nondestructive testing system 200 in the first embodiment. The nondestructive testing system 200 in the first embodiment includes a sensor module 40 and a server apparatus 50.

First, the sensor module 40 of the first embodiment will be described.

The sensor module 40 of the first embodiment includes detection apparatuses 100-1 to 100-n (n is any integer equal to or larger than one), band-pass filters (BPF) 41-1 to 41-n, analog-to-digital converters (ADC) 42-1 to 42-n, a clock source 43, a time-information generation unit 44, a signal processor 45, and a communication controller 46.

Below, the detection apparatuses 100-1 to 100-n will be simply referred to as a detection apparatus 100 in a case where they are not distinguished. Likewise, the BPFs 41-1 to 41-n and the ADCs 42-1 to 42-n will be referred to a BPF 41 and an ADC 42, respectively, in a case where they are not distinguished.

The description of the detection apparatus 100, which is the same as that given with reference to FIG. 9, is omitted here.

A voltage signal output from the detection apparatus 100 is input to the BPF 41. The BPF 41 removes a noise component lying outside a signal band from the voltage signal. The BPF 41 inputs the voltage signal from which a noise component is removed to the signal processor 45.

The ADC 42 generates discretized waveform data from the voltage signal, from which a noise component has been removed, and inputs the waveform data to the signal processor 45.

The clock source 43 is a quartz oscillator, for example.

The time-information generation unit 44 is mounted in a Field programmable gate array (FPGA), for example. The time-information generation unit 44 generates time information accumulated from the time of turn-on, in response to a signal provided from the clock source 43. More specifically, the time-information generation unit 44 is treated as a counter that counts an edge of a clock and a value in a register of the counter can be used as time information.

The signal processor 45 is formed of an FPGA, for example. Use of a nonvolatile FPGA can reduce power consumption during standby. The signal processor 45 performs signal processing on waveform data received from the ADC 42, thereby generating AE data to be transmitted to the server apparatus 50. Detailed description of signal processing performed by the signal processor 45 will be given later with reference to FIG. 11.

The communication controller 46 controls radio communication with an external apparatus such as the server apparatus 50. The communication controller 46 is formed of an FPGA, for example. The communication controller 46 transmits AE data generated by the signal processor 45 by radio with predetermined timing. As a radio frequency band, a so-called industry science medical (ISM) band such as a 2.4 GHz band or a 920 MHz band (a band of 915 MHz to 928 MHz in Japan) can be used, for example.

Additionally, the time-information generation unit 44, the signal processor 45, and the communication controller 46 may be formed of a dedicated LSI instead of an FPGA.

Power of the sensor module 40 is supplied from an external power supply, a primary battery, a secondary battery, a solar battery, an energy harvester, or the like. Power of an analog circuit is generated by an insulating switching power supply, using power having been input. A digital signal quantized by an AD converter is transmitted to the signal processor 45 through a digital isolator. In this manner, an analog ground and a digital ground can be separated from each other, thereby preventing mutual propagation of noises. The analog ground and the digital ground may be short-circuited at a single point if necessary.

The sensor module 40, which includes a board-mounted nonvolatile memory (NVRAM: Non-volatile RAM) such as a flash memory or magneto-resistive random access memory (MRAM), can store threshold-value information or the like therein. This eliminates a need for resetting that would be required upon loss of power.

Additionally, the sensor module 40 may include a removable memory, a flash memory, and the like, aside from the board-mounted nonvolatile memory. For example, a removable memory card such as an SD card is inserted into the sensor module 40 and AE data that will be described later is accumulated in the memory card. This enables monitoring in a place where radio communication is unavailable.

Example of Signal Processor

Figures 11, 12:
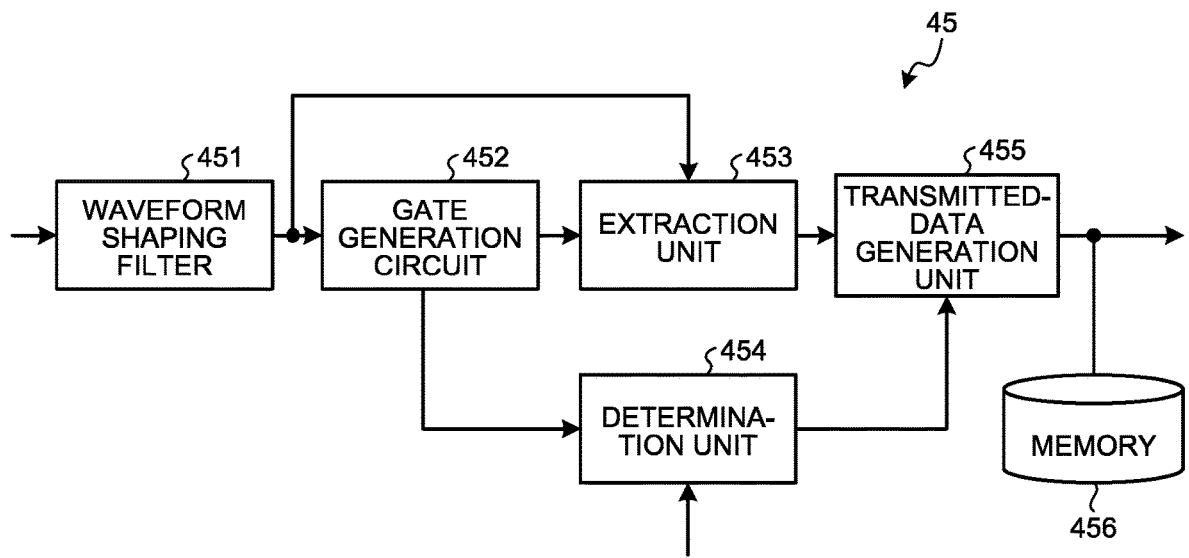
FIG. 11 is a diagram illustrating an example of a signal processor in the first embodiment.
FIG. 12 is a diagram illustrating an example of propagation-velocity information in the first embodiment.
Figure 13:
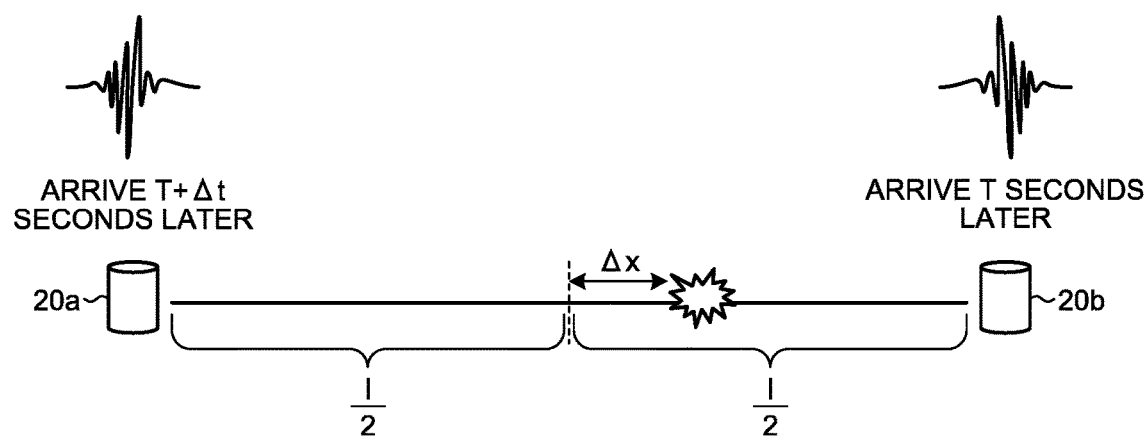
FIG. 13 is a diagram for explaining an example of a position locating method in the first embodiment.

FIG. 11 is a diagram illustrating an example of the signal processor 45 in the first embodiment. The signal processor 45 in the first embodiment includes a waveform shaping filter 451, a gate generation circuit 452, an extraction unit 453, a determination unit 454, a transmitted-data generation unit 455, and a memory 456.

The waveform shaping filter 451 shapes waveform data upon receipt of the waveform data from the ADC 42 and inputs the shaped waveform data to the gate generation circuit 452.

The gate generation circuit 452 extracts a series of sustained waveforms from the shaped waveform data upon receipt of the waveform data from the waveform shaping filter 451. The gate generation circuit 452 is implemented by an envelope detector and a comparator, for example. In this case, the gate generation circuit 452 outputs a gate signal that becomes H when an envelope is above a predetermined threshold value and becomes L when an envelope is below the predetermined threshold value.

The extraction unit 453 processes the waveform data when the gate signal is H and extracts a parameter that characterizes a waveform. The extraction unit 453 extracts, as a parameter, a value such as signal amplification, energy, a rise time, a duration, a frequency, a zero cross count value, or the like.

The determination unit 454 determines arrival-time information of an elastic wave based on time information and a rise time of the gate generation circuit.

The transmitted-data generation unit 455 generates a group of pieces of AE data by correlating a parameter extracted by the extraction unit 453 and an arrival-time information determined by the determination unit 454. The transmitted-data generation unit 455 stores AE data into the memory 456 such as a dual-port RAM, for example. Alternatively, the transmitted-data generation unit 455 may input AE data directly to the communication controller 46 without storing AE data into the memory 456, for example.

Next, referring back to FIG. 10, the server apparatus 50 of the first embodiment will be described. The server apparatus 50 of the embodiment includes a communication controller 51, a database (DB) 52, a locator 53, and a diagnosis unit 54.

The communication controller 51 controls radio communication with an external apparatus such as the sensor module 40. When, for example, the communication controller 51 receives AE data transmitted from the sensor module 40, the communication controller 51 stores the AE data into the DB 52. The DB 52 is implemented by a storage device inside or outside the server apparatus 50, for example.

The locator 53 locates the position of a damage in the test object 30 based on an output signal resulting from conversion of an elastic wave by a plurality of sensors 20. The locator 53 reads out AE-data groups from the DB 52 at a predetermined timing and performs noise processing including position locating or the like based on a parameter and arrival-time information. More specifically, the locator 53 locates a position based on a difference in arrival time between AE waveforms and propagation-velocity information, first.

Calculation of Difference in Arrival Time

Elastic waves derived from a certain single generation source are detected by the plurality of detection apparatuses 100-1 to 100-N. In order to calculate a difference in arrival times of the elastic waves, the locator 53 extracts, from AE-data groups, an AE-data group that is derived from the same generation source.

Selection of Propagation-Velocity Information

As propagation-velocity information, a lookup table prepared in advance is used, for example.

FIG. 12 is a diagram illustrating an example of propagation-velocity information in the first embodiment. In FIG. 12, a lookup table, in which ultrasonic propagation velocities of respective materials are stored, is used as the propagation-velocity information.

A propagation velocity of an elastic wave propagating through a material is expressed by the following Expression (11) that uses a bulk elastic modulus (Pa) and a density (kg/m3) of the material.

$$v = \sqrt{\frac{k}{\rho_0}} \tag{11}$$

In a case of a three-dimensional object, the propagation velocity of an elastic wave propagating therethrough is expressed by the following Expression (12) in which G represents a shear elastic modulus.

$$v = \sqrt{\frac{1}{\rho_0} \cdot \left(K + \frac{4}{3}G\right)} \quad (12)$$

This means that propagation velocity is determined only by κ and $\rho_0$ that represent property values characteristic of a material. Thus, propagation velocities of respective materials are calculated in advance, and the lookup table as illustrated in FIG. 12 can be used. The locator 53 refers to the lookup table in selecting a propagation velocity, thereby selecting an appropriate propagation velocity for each material.

Example of Position Locating Method

Here, one dimension is assumed to simplify discussion.

FIG. 3 is a diagram for explaining an example of a position locating method in the first embodiment. In this case, it is sufficient that at least a couple of sensors 20a and 20b are provided.

Below, there will be described about a case where a crack occurs in the test object 30 between the sensor 20a and the sensor 20b and the sensor 20a and the sensor 20b detect an elastic wave caused by the crack. A distance between the sensor 20a and the sensor 20b is set to "l". Further, a distance from a midpoint between the sensor 20a and the sensor 20b to the crack is set to Δx. In a case where the sensor 20b detects an elastic wave T seconds later and the sensor 20a detects the elastic wave (T+Δt) seconds later, an arrival-time difference Δt can be expressed by the following Expression (13).

$$\Delta t = \left(\left(\frac{l}{2} + \Delta x\right) - \left(\frac{l}{2} - \Delta x\right)\right) / v = 2\Delta x / v \quad (13)$$

The arrival-time difference Δt can be calculated from, for example, characteristic-quantity information and time information that correspond to a detection signal provided from individual each sensor 20. The arrival-time difference Δt can be calculated from a difference in pieces of time information corresponding to analogous pieces of characteristic-quantity information, for example. Thus, when the distance "l" between the sensor 20a and the sensor 20b and a propagation velocity v of an elastic wave are known, the distance Δx from a midpoint between the sensor 20a and the sensor 20b to the crack can be calculated from the calculated arrival-time difference Δt and the above-described Expression (13). In other words, the locator 53 is able to specify positional information of the crack (generation source of an elastic wave) from the arrival-time difference Δt.

As described above, in the case of one dimension, Δx is determined by observing Δt, and the position of the generation source can be located when the distance "l" between the sensors 20 is known. Also in two or more dimensions, by using at least (the number of dimensions+one) sensors 20, it is possible to perform similar position locating.

Based on the result of position locating, the locator 53 recognizes, as a noise, an elastic wave that is determined to have been generated outside a predetermined observation range. Thus, in removing a noise, it is determined whether an elastic wave is a noise or not (a significant signal) based on a predetermined threshold value. In this regard, threshold value conditions can be flexibly changed by noise processing performed by the server apparatus 50. More specifically, threshold value conditions can be flexibly determined with consideration given to many conditions including placing situations of the sensors 20, conditions of the test object 30, climatic conditions, and the like, so that a noise can be removed more effectively.

The diagnosis unit 54 determines the degree of deterioration of the test object 30 such as a structure using AE data that is determined not to be a noise as a result of noise processing performed by the locator 53. The diagnosis unit 54 outputs a signal representing a risk of deterioration when cumulative energy of an elastic wave becomes equal to or higher than predetermined energy, for example.

Example of Hardware Configuration

Figure 14:
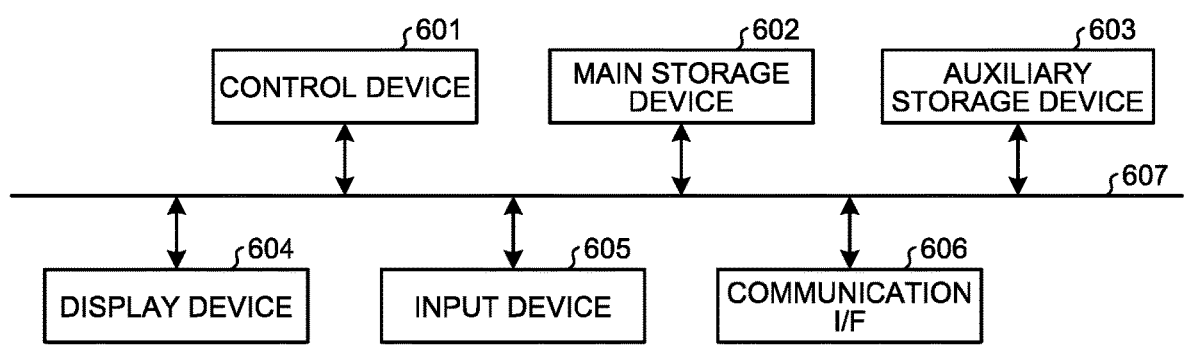
FIG. 14 is a diagram illustrating an example of a hardware configuration of a server apparatus in the first embodiment.

FIG. 14 is a diagram illustrating an example of a hardware configuration of the server apparatus 50 of the first embodiment. The server apparatus 50 of the first embodiment includes a control device 601, a main storage device 602, an auxiliary storage device 603, a display device 604, an input device 605, and a communication I/F 606. The control device 601, the main storage device 602, the auxiliary storage device 603, the display device 604, the input device 605, and the communication I/F 606 are connected though a bus 607.

The control device 601 is a device such as a CPU that executes a program read from the auxiliary storage device 603 to the main storage device 602. The main storage device 602 includes memories such as a ROM and a RAM. The auxiliary storage device 603 is an HDD, a memory card, or the like.

The display device 604 displays a state and the like of the server apparatus 50. The display device 604 is a liquid crystal display or the like, for example. The input device 605 is an interface for operating the server apparatus 50. The input device 605 is a keyboard, a mouse, or the like, for example. In a case where the server apparatus 50 is a smart device such as a smartphone or a tablet terminal, a touch panel, for example, serves as the display device 604 and the input device 605. The communication I/F 606 is an interface for communicating with the detection apparatus 100 or the like.

A program executed in the server apparatus 50 of the first embodiment is recorded in an installable-format file or an executable-format file on a computer-readable storage medium such as a CD-ROM, a memory card, a CD-R, or a DVD and is provided as a computer program product.

Alternatively, there may be formed a configuration in which a program executed in the server apparatus 50 of the present embodiment is stored on a computer connected to a network such as the Internet and is provided by being downloaded over the network. Further alternatively, there may be formed a configuration in which a program executed in the server apparatus 50 of the present embodiment is provided over a network such as the Internet without being downloaded.

Moreover, there may be formed a configuration in which a program in the server apparatus 50 of the present embodiment is provided while having been loaded into a ROM or the like.

A program executed in the server apparatus 50 of the present embodiment has a module configuration including functional blocks that can be implemented also by a program, in the above-described functional blocks of the server apparatus 50 in FIG. 10. To implement each of the functional blocks using actual hardware, the control device 601 reads out a program from a storage medium and executes the program to load the above-described functional blocks onto the main storage device 602. In other words, the above-described functional blocks are formed on the main storage device 602.

Additionally, a part or a whole of the above-described functional blocks in FIG. 10 may be implemented by hardware such as an IC, instead of being implemented by software.

Further, in a case of using a plurality of processors to implement each function, each of the processors may implement either one of the functions or two or more of the functions.

Moreover, the server apparatus 50 of the present embodiment may operate in any form. For example, the server apparatus 50 of the present embodiment may be caused to operate in the form of a cloud system on a network.

Additionally, also the time-information generation unit 44, the signal processor 45, and the communication controller 46 in the sensor module 40 may be implemented by hardware in FIG. 14. In this case, to implement the time-information generation unit 44, the signal processor 45, and the communication controller 46, the control device 601 reads out a program from a storage medium and executes the program, so that the above-described functional blocks are loaded onto the main storage device 602. In other words, the above-described functional blocks are formed on the main storage device 602.

As described above, in the nondestructive testing system 200 of the first embodiment, the convergence member 10 comes into contact with the test object 30 and has an elastic-modulus distribution in which an elastic modulus decreases as a distance to a center of the convergence member 10 increases. The sensors 20 are placed in an area including the center of the convergence member 10 and detect an elastic wave generated from the test object 30 through the convergence member 10. Then, the locator 53 locates the position of a damage in the test object 30 based on an output signal resulting from conversion of the elastic wave by the plurality of sensors 20.

Thus, the nondestructive testing system 200 of the first embodiment can detect a weak elastic wave. More specifically, using the convergence member 10 allows a weak elastic wave to be sensitively detected with a simple configuration. The nondestructive testing system 200, which can detect a weak elastic wave, can thus detect a damage that is caused in a very early stage and could not be detected conventionally, for example.

Second Embodiment

Next, a second embodiment will be described. In the description of the second embodiment, the same explanation as in the first embodiment is omitted, and differences from the first embodiment will be described. The second embodiment deals with a noise cancellation system using the convergence member 10 described in the first embodiment.

FIG. 15 is a diagram illustrating an example of a noise cancellation system 300 in the second embodiment. The noise cancellation system 300 of the second embodiment includes convergence members 10a to 10i and a sensor 20.

The convergence members 10a to 10h are placed around a test object 30. The test object 30 may be either a physical object or an area to be tested. The convergence members 10a to 10h cancel a noise propagating through the test object 30 by capturing a noise propagating from the periphery of the test object 30 to the test object 30.

The convergence member 10i is placed between the sensor 20 and the test object 30. The sensor 20 is placed in an area including the center of the convergence member 10i.

With the noise cancellation system 300 of the second embodiment, the sensor 20 can detect an elastic wave generated from the test object 30 while a noise propagating from the periphery of the test object 30 has been cancelled by the convergence members 10a to 10h. Further, the sensor 20 can detect also a weak elastic wave by detecting an elastic wave generated from the test object 30, through the convergence member 10i.

For example, the convergence member 10 may have a shape of a polygon (n-gon, n is an integer equal to or larger than three). In this case, the convergence member 10 has an elastic-modulus distribution in which an elastic modulus decreases as a distance to a boundary (outside) of a polygon decreases.

Further, for example, a power generation system including the above-described detection apparatus 100 and a power generation unit may be formed. The power generation unit converts energy of an output signal resulting from conversion of an elastic wave by the sensor 20, into electric power. The sensor 20 detects an elastic wave through the convergence member 10, so that vibration power generation can be achieved more efficiently.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A detection apparatus comprising:
    a convergence member configured to come into contact with a test object, the convergence member having an elastic-modulus distribution in which an elastic modulus decreases as a distance from a center of the convergence member increases; and
    a sensor placed in an area including the center of the convergence member, the sensor being configured to detect, through the convergence member, an elastic wave generated from the test object.

2. The apparatus according to claim 1, wherein
    the convergence member has a shape of a circle, and
    the convergence member has an elastic-modulus distribution in which an elastic modulus is inversely proportional to a radius in a radial direction from the center of the convergence member.

3. The apparatus according to claim 1, wherein
    the convergence member has a shape of a polygon, and
    the convergence member has an elastic-modulus distribution in which an elastic modulus decreases as a distance to a boundary of the polygon decreases.

4. The apparatus according to claim 1, wherein
    the convergence member includes a pore smaller than a wavelength of the elastic wave, and the elastic-modulus distribution is determined based on porosity representing a proportion of the pore to the convergence member.

5. The apparatus according to claim 1, wherein a principal material of the convergence member is alumina.

6. A nondestructive testing system comprising:
at least one detection apparatus according to claim 1, and
a locator configured to locate a position of a damage in the test object based on an output signal resulting from conversion of the elastic wave by the sensor.

7. A power generation system comprising:
the detection apparatus according to claim 1, and
a power generation unit configured to convert, into electric power, energy of an output signal resulting from conversion of the elastic wave by the sensor.

8. A convergence member placed between a sensor for detecting an elastic wave generated from a test object and the test object,
wherein the convergence member has an elastic-modulus distribution in which an elastic modulus decreases as a distance to a center of the convergence member increases.

9. A noise cancellation system comprising:
a sensor configured to detect an elastic wave generated from a test object; and
a convergence member placed around the sensor, the convergence member having an elastic-modulus distribution in which an elastic modulus decreases as a distance to a center of the convergence member increases.

* * * * *